Patented Apr. 15, 1947

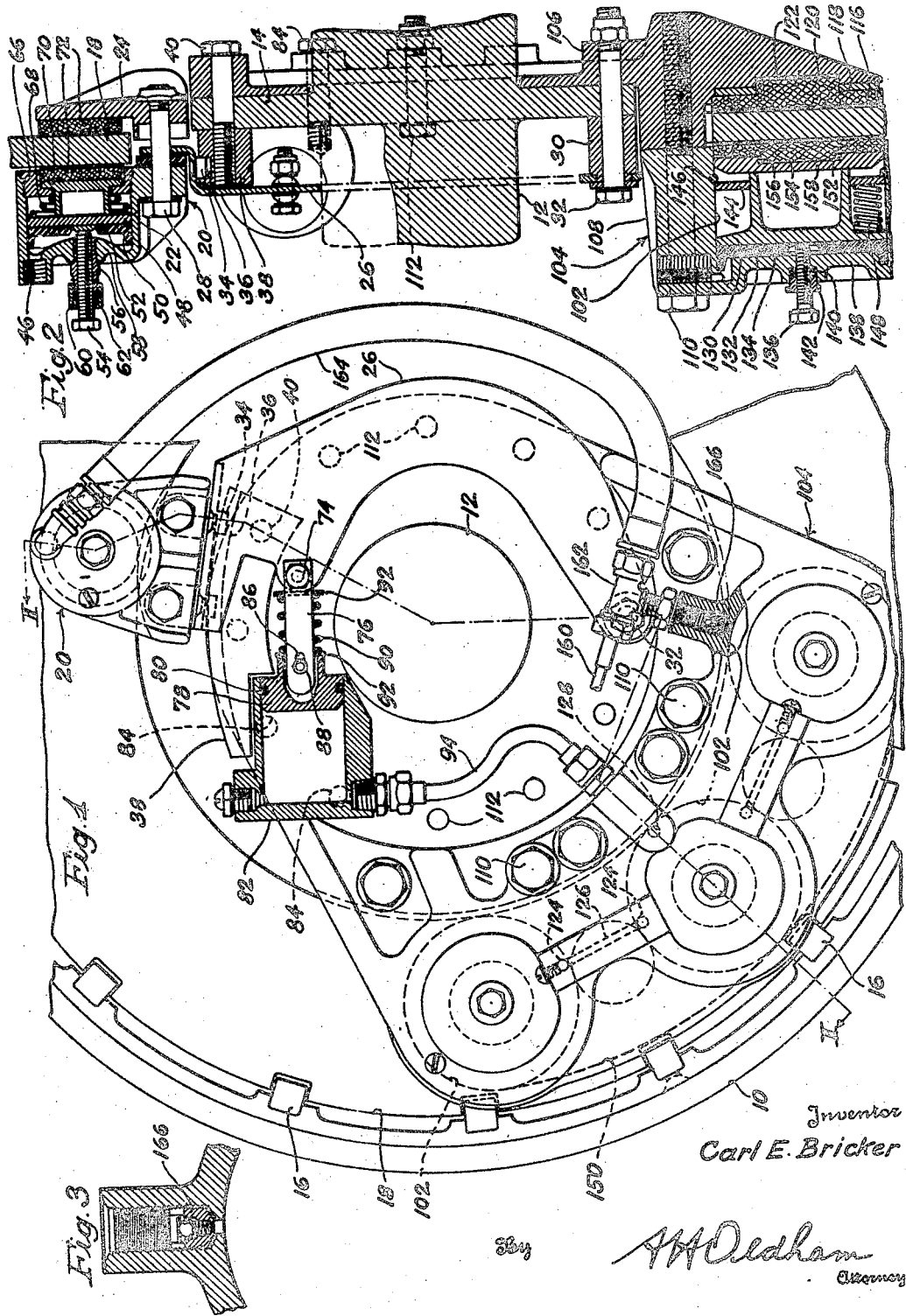

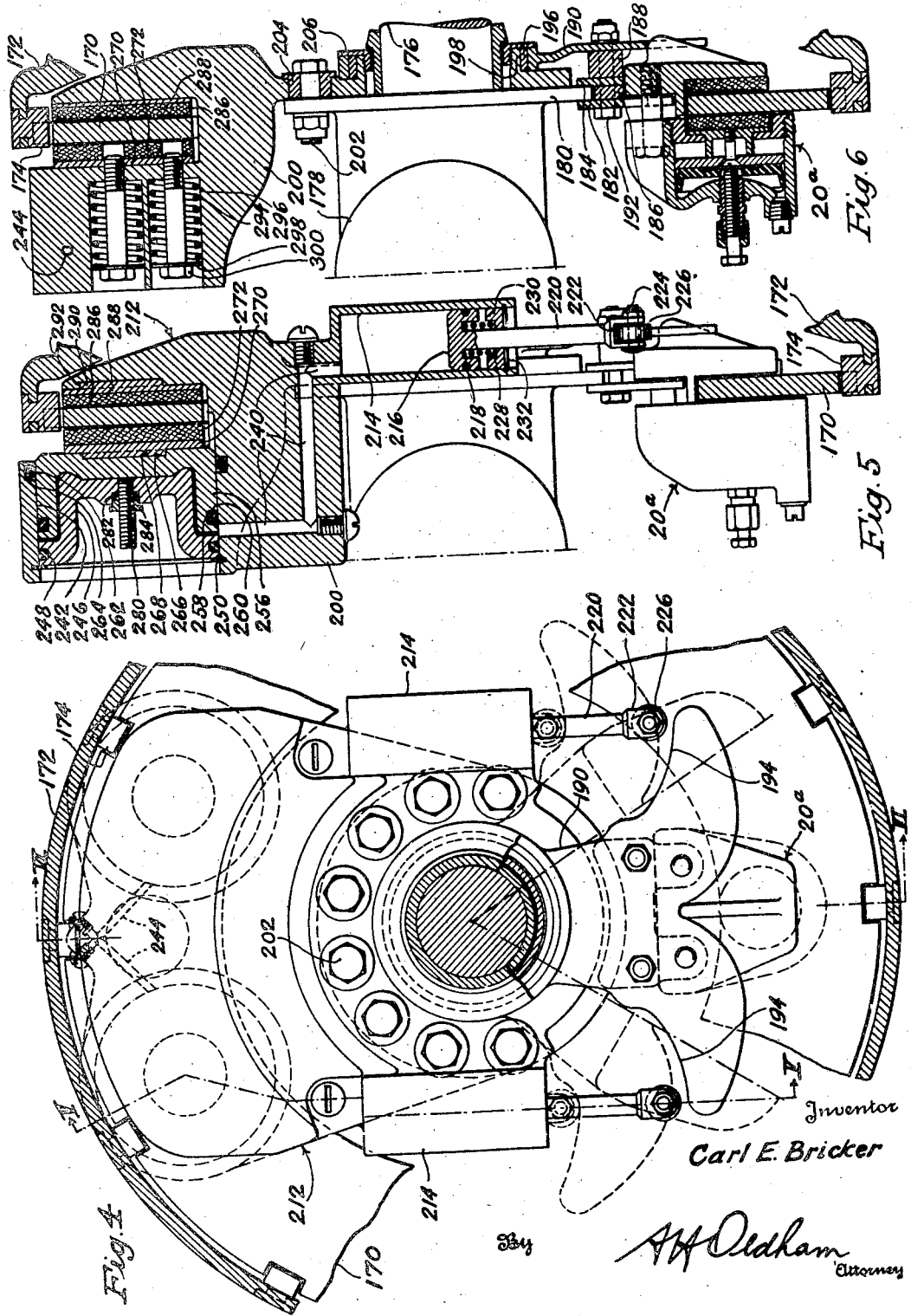

2,419,113

UNITED STATES PATENT OFFICE 2,419,113

BOOSTER BRAKE

Carl E. Bricker, Akron, Ohio, assignor to Wingfoot Corporation, Akron, Ohio, a corporation of Delaware Application April 26, 1944, Serial No. 532,707

15 Claims. (Cl. 188—152)

This invention relates to brakes for rotary members including vehicle wheels and, in particular, to that class of brakes known as disk brakes.

Heretofore, it has been known to provide wheel brakes with a mechanism or servo device whereby the braking force is effected by the wheel torque itself. Known constructions, however, are open to various objections, including locking tendencies, size restrictions, and inability to achieve the desired braking force, and do not fully meet the requirements which are essential when a heavy vehicle, for instance, an airplane at great landing speed, must be stopped within a relatively short distance by manually-actuated means. A very difficult engineering problem is presented when a manually-operated brake having foot pedal control moved through a distance of not more than four inches with a force of 100 pounds must be utilized to stop within a reasonable distance an airplane, for example, weighing up to 20 or more tons. A five-ton airplane landing at a speed of 82 miles per hour possesses over 2,000,000 foot pounds of kinetic energy which must be absorbed.

This invention, which is an improvement over prior brake constructions, is particularly applicable for hydraulic brakes, however, its new principle, which includes a braking force booster unit, may also be adapted for brake constructions operated by mechanical means.

The general object of the invention is to provide a relatively inexpensive, long-lived, readily operated, non-locking, self-energizing brake of large work-absorbing capacity, and, particularly, a brake adapted to use with large airplanes.

Another object of this invention is to provide means through which the braking force applied by the operator to the brake disk is greatly multiplied.

Another object of this invention is to provide a brake including a swingable booster brake unit transmitting its braking force to a booster unit hydraulically connected to pressure means of a main brake unit.

Another object of this invention is the provision of brake apparatus wherein the application of the wheel torque exerted upon the piston of a hydraulic booster unit is for the purpose of multiplying the braking force by imparting the pressure built up in the booster unit to one or more pressure cylinders of greater single or overall cross-sectional area disposed in the main brake unit than that of the booster unit.

Another object of this invention is hydraulic separation of the main brake unit from the brake fluid main feed-line while the brake is in operation and providing hydraulic communication with it while the brake is inactive.

Another object of the invention is the provision of braking apparatus including movably mounted means for clamping on a braking disk, booster unit means energized by the movement of the movably mounted means, and main brake units energized by the booster unit.

The aforesaid objects of this invention and other objects which will become apparent as the description proceeds are achieved by providing a hydraulic booster brake unit actuated from a master cylinder by the operator. The booster brake cylinder is mounted on a lever which is swingable about a fixed pivot and has limited movement. It is operatively connected by mechanical means to a booster unit to which it imparts its braking force to build up fluid pressure therein which again is transmitted to cylinders in a main brake unit. Because of the much larger cross-sectional area of these cylinders over that of the booster unit, the braking force is accordingly multiplied and thus is more effective.

For a better understanding of the invention, reference should be had to the accompanying drawings, wherein Fig. 1 is a fragmentary side view of one embodiment of the invention partly shown in cross-section; Fig. 2 is a cross-sectional view taken on line II—II of Fig. 1; Fig. 3 is a cross-sectional view in larger scale of the check valve inserted in the main brake unit; Fig. 4 is a view, similar to that of Fig. 1, of a modification of the invention; Fig. 5 is a cross-sectional view taken on line V—V of Fig. 4; and Fig. 6 is a cross-sectional view taken on line VI—VI of Fig. 4.

Although the principles of this invention are illustrated only in connection with a hydraulically-operated brake and a single wheel, the invention is also adapted for operation with a mechanically-operated booster brake unit and for double-wheel arrangement. Also, the invention has been shown in conjunction with an airplane wheel, a use to which the brake of the invention is particularly adapted. However, the principles of the invention are broadly applicable to braking movable members of substantially any and all kinds.

Referring now to the Figures 1 and 2, the numeral 10 indicates an airplane wheel rotatable about a shaft 12 having a flange 14 and being supported by a landing gear structure (not shown) of an airplane. The wheel 10 is interlocked by keys 16 fastened to the wheel rim with a brake disk 18 which rotates together with the wheel.

The brake includes a booster brake unit 20, indicated as a whole, consisting of a brake shoe 22 in the form of a hydraulic cylinder at one side of the brake disk and of a flange-shaped shoe 24 at the opposite side thereof. The shoes 22 and 24 are held together and fastened to one end of a curved lever 26 by bolts 28. The lever, spaced at its other end from the flange 14 by a spacer 30, is swingable about a fixed pivot or bolt 32 passing through the flange 14. To prevent axial displacement of the offset, swinging end of the lever 26, it carries fastened thereto two keys 34 which can slide in a groove 36 of the guide piece 38 which is fastened to the flange 14 by head bolts 40.

The cylinder 22, has a brake fluid inlet 46 connectable with a master cylinder (not shown) actuated by the operator. The cylinder movably receives a piston 48 sealed by a flexible cup 50 having a metal center piece 52 embedded therein against which butts an adjusting screw 54. This screw, turning in the inside thread of the nipple 56, which, in turn, is screwed into the cylinder head 58, holds the piston in proper position. A packing 60 and a cap nut 62 screwed over the nipple 56 seal the adjusting screw against leakage of brake fluid. Into the open end of the cylinder 22 is screwed a lock ring 66 holding a spring 68 against the piston 48, and, passing through the opening of the lock ring is a movable support 70 in contact with the piston and carrying at its other end a brake lining 72 of circular shape facing the brake disk. Opposite thereof at the other side of the brake disk the shoe 24 has attached to it a similar brake lining 72.

The lever 26 has attached to it by a pivot 74 a push rod 76 which has sufficient side clearance to engage the socket of a piston 78 provided with a packing ring 80 and movable in the booster cylinder 82 which is fastened in fixed position to the wheel shaft flange 14 by screws 84. For the purpose of compensating for fluid expansion the piston 78 is made slidable on the piston rod 76 by providing an oblong hole 86 in the piston rod in which the pin 88 of the piston is movable and a spring 90 between washers 92 resting against the piston 76 and the lever 26, respectively. By a connecting conduit 94 the pressure built up in the booster cylinder is transmitted through the operating liquid to one or more cylinders 102 forming part of a main brake unit 104 (indicated as a whole).

This main brake unit 104 includes two brake shoes 106 and 108, on opposite sides of the brake disk 18, and connected together by head screws 110. The brake shoe 106 is fastened by the bolts 32, 40, 84, and 112 to the fixed flange 14 and contains a brake lining 116 reinforced by a steel plate 118 and having button-shaped bosses 120 passing through the plate 118 and fitting into sockets 122 of the brake shoe 106. The brake shoe 108 is provided with a plurality, for example three, pressure cylinders 102 interconnected by holes 124 and 126 and the middle cylinder having an inlet 128 through which the pressure liquid is forced from the booster cylinder 82 by means of the conduit 94. In each one of the cylinders 102 moves a piston 130 sealed against outflow of brake fluid by a flexible cup 132 into which is embedded a metal disk 134 free in the center for being contacted by an adjusting screw 136 inserted into the cylinder head 138, sealed by a packing 140 and tightened by a gland bushing 142 provided with an inside thread. A retaining plate 144 resting against a spring ring 146 fitting into a groove in the cylinder wall serves as a support for the springs 148 which hold the piston under liquid pressure against the adjusting screw 136 slightly spaced from the cylinder head. An annular cavity 150, having the width of the cylinder diameter and being of suitable depth between adjacent cylinders, takes up the brake lining 152 provided with button-shaped bosses 154 inserted in cavities 156 of the reinforcing plate 158 in contact with the outer end of the piston 130.

The modification of the invention shown in Figs. 4 to 6 is adapted to provide a self-energizing braking action upon rotation of the wheel in either direction, whereas the form of the invention of Figs. 1 to 3 acts only when the wheel is rotating in one direction. More particularly, in Figs. 4 to 6 the booster brake unit 20ª, controlled by the operator, is of a construction identical to that of the one-way brake described. It cooperates with the brake disk 170 which is interlocked with the wheel 172 by keys 174 fastened thereto. The wheel is fixed with the shaft 176 which is journaled (not shown) in an airplane landing gear structure 178 provided with an end flange 180. The brake unit 20ª is carried by a guide plate 182, which is spaced from the guide plate 184 at the opposite side of the flange 180 by a distance piece 186 and the guide plate 184 is spaced by a distance piece 188 from a cam lever 190. The guide plates 182 and 184 are fastened by bolts 192 to the lever 190 which is swingable about the wheel shaft.

The lever 190 is provided at its outer end with symmetrical cams 194 and is journaled at the inner end on a bushing 196 pressed upon a hub-like extension 198 of a set of brake shoes 200. The brake shoes 200 are made in one piece of light material, usually magnesium, which is fastened by bolts 202, passing through shouldered steel bushings 204 in the brake shoe, to the flange 180. A retaining ring 206 screwed into the brake shoe holds the cam lever in place. The brake shoes 200 form a part of the main brake unit, indicated as a whole by the numeral 212, and are integrally united with two pressure booster cylinders 214, one for forward and one for backward movement of the wheel. Each cylinder 214 slidably receives a piston 216, a sealing ring 218, and a piston rod 220. The piston rod 220 has a forked end 222 which carries, by a bolt 224, a roller 226.

Each piston 216 is actuated against the operating liquid of the cylinders 214 by a cam 194 on cam lever 190, which cam engages the roller 226 when the booster brake unit 20ª is applied to the brake disk 170. The cams in swingout position and with the piston pushed back as far as possible are shown by dotted lines. The contour of the cam cooperating with the roller 226 is so shaped that the piston pressure will act upon the cam in a way to produce a side component compensating the roller friction to avoid bending stresses in the piston rod as much as possible. In other words, the point of engagement of the roller with the cam lies somewhat off the center line of the piston rod towards the outside of the cam. A spring 228 supported by a ring 230, held by a spring lock ring 232 in the cylinder wall and pressing against the piston 216 may be applied for compensating fluid expansion.

Each booster cylinder 214 is hydraulically connected by holes 240 with one of the two pressure chambers or cylinders 242 provided on one side of the brake shoe set 200. The cylinders 242 are connected with each other by holes 244. Each cylinder 242 is provided at one side with a removable hat-shaped cylinder head 246 containing a sealing ring 248 towards the cylinder wall and being held in place by a spring ring 250 snapped into a groove in the cylinder wall. A piston 256 of diametrically U-shaped cross-section carrying a sealing ring 258 in a groove 260 and leaving an annular space of low height between itself and the cylinder head 246 is movable in the cylinder 242 and fits loosely over the offset cylinder portion of the cylinder head. The piston 256 is generally additionally sealed by a second ring 262 inserted in a groove 264 in the cylinder wall. Into a cavity 266 in the piston head fits a button-shaped boss 268 formed on a reinforcing plate 270 to which is attached the brake lining 272 facing one side of the brake disk 170. An adjusting screw 280 on the cylinder head is provided to adjust the proper distance between brake lining and brake disk. It is sealed against leakage of pressure liquid by a packing 282 in combination with an inside-threaded gland 284.

The brake lining 286 on the opposite side of the brake disk is attached to a reinforcing plate 288 which has button-like bosses 290 fitting into corresponding cavities 292 in the brake shoe 200. Between the cylinders 242 are disposed springs 294 in holes 296 and held under tension against washers 298 by head screws 300 fastened into the plate 270 of the brake lining 272 for the purpose of retracting the brake lining from the brake disk. Although not shown in the drawing, the brake fluid feed line, including a check valve in the main brake unit, will be similarly provided as shown in the construction of the one-way brake and hereinafter described.

Even though it is believed the operation of the brake device will be apparent from the foregoing description, a brief review thereof will now be made for purposes of summary and simplification. Attention should be directed to Figs. 1 to 3, although it will be understood that the apparatus of Figs. 4 to 6 functions similarly.

The main parts of this brake construction, as illustrated, are all interdependent and consist of a hydraulically-operated booster brake unit 20 controlled from a master cylinder (not shown) actuated by the operator. This unit is attached to the free end of a lever 26 which is swingable about a fixed pivot. When the booster brake unit is energized, its friction with the brake disk forces it to push the piston in the booster cylinder 82 against the enclosed brake fluid and produces a desired pressure and displacement on the main brake unit 104.

By appropriately designing the stroke and diameter of the booster unit any desired volume of displacement or working pressure desired can be produced within relatively wide limits of requirement. It might be noted here, however, that the usual function of the booster unit is not to increase the pressure of the braking fluid, although this can be done if desired, but is to increase the volume of displacement without sacrifice of working pressure. In other words, it has been found that in manually-operated brakes about all an operator can do is displace one cubic inch of fluid at a pressure of 600 pounds per square inch or the equivalent thereof, for example, two cubic inches at a pressure of 300 pounds per square inch. Now, when a large number of braking cylinders are employed to absorb a large foot-pound energy, then considerable fluid displacement is required at relatively high pressure. The one cubic inch displacement of 600 pounds pressure which can be generated by an operator is not sufficient for this purpose, but it is sufficient to adequately operate the booster brake unit 20, which, when clamped to the brake disk 18 of the wheel, serves to operate the booster unit as above set forth to provide the desired displacement and pressure on the main brake unit 104.

The design of the booster unit 82 and its associated arm 26 is generally such that the pressure which is built up in it is kept slightly lower than that transmitted from the master cylinder to the booster brake unit. This relation of pressure facilitates renewal of brake fluid in the system as hereinafter described. It might be noted, also, because the space between the brake linings and the brake disk can be kept very small, the length of the booster cylinder can be made relatively short.

The renewal of any brake fluid which should eventually leak out during a certain period of operation can be readily achieved by having all units hydraulically connected, as by nipple 164, with the feed line coming from the master cylinder while the brake is not operated. During operation of the brake, a check valve inserted in the main brake unit feed line shuts off this brake unit from the main brake fluid feed line by the greater pressure in the feed line.

More particularly, the brake fluid feed line 160 coming from the master cylinder actuated by the operator is provided with a T-fitting 162 from which continues a flexible nipple 164, attached to the movable booster brake unit, whereas the middle branch of the T-fitting is attached to the stationary main brake unit. In this fluid inlet to the main brake unit is inserted a check valve 166 which is closed when the main fluid feed line is kept under pressure and which opens outwardly when the pressure transmitted to the booster brake unit is released. Under such condition, any brake fluid which leaks out from one of the cylinders during a braking operation will be immediately replaced from the main line. With the use of the check valve 166 the springs shown in connection with the booster cylinder pistons 78 and 216, respectively, for the compensation of fluid expansion may be dispensed with, since the fluid enclosed in the pressure cylinders can freely expand through the check valve when the brake is not in operation, that is, when no pressure is in the fluid feed line.

It will be understood, as above noted, that, while the brake is operated, the pressure applied to the booster brake cylinder will be always greater than that developed in the cylinders of the cylinder and, accordingly, in the cylinders of the main brake unit, to prevent hydraulic communication between the two brake units. This condition is achieved by properly dimensioning the diameters of the master cylinder, the booster brake cylinder, and the booster cylinder, as heretofore described. It should be mentioned that the booster brake unit allows for longitudinal brake disk movement so that if wear of the linings on booster brake and main brake units is not at the same rate, the brake disk will still turn freely without binding in brake off position. This also allows for disk dishing without causing brake drag.

This invention is applicable to any vehicle wheel, as well as to any movable or rotary member. Its application is of particular advantage

I claim:

1. In combination, a movable member, a braking surface on the movable member, a fixed element associated with the movable member, a booster brake unit adapted to have braking engagement with the braking surface of the movable member, means mounting the booster brake unit for limited movement with the movable member, a separate booster unit carried by the fixed element to be energized by said booster brake unit substantially tangential to the movement thereof and in alignment with said booster unit, main brake units carried by the fixed element adapted to engage with the braking surface of the movable member, and means for energizing the main brake units from the booster unit.

2. In a brake, the combination of a revolvable wheel including friction means, a booster brake means coactive from both sides with said friction means and movable to a limited extent therewith, separate booster means operatively connected with and energized by said booster brake means substantially tangential to the movement thereof and in alignment with said booster means, and main brake means coactive from both sides with said friction means and being cooperatively connected with said booster means.

3. In a brake, the combination of a revolvable wheel including a brake disk, a hydraulic booster brake unit actuated by the operator and being movable to a limited extent together with the brake disk and coactive therewith, a separate stationary hydraulic booster cylinder adapted to be operated by the braking force of said booster brake unit and being substantially in alignment with a tangent on the circle on which the braking force acts, and a main brake unit including at least one pressure cylinder hydraulically connected with said booster cylinder and exerting upon the brake disk a multiple of the force developed in the booster cylinder.

4. In a brake, the combination of a revolvable wheel including a brake disk, a hydraulic booster brake unit actuated by the operator and being movable to a limited extent together with the brake disk and coactive therewith, a separate stationary hydraulic booster cylinder of relatively small diameter adapted to be operated by the braking force of said booster unit and being substantially in alignment with a tangent on the circle on which the braking force acts, and a mainbrake unit including a plurality of pressure cylinders of relatively large diameter hydraulically and communicating with each other connected with said booster cylinder and exerting upon the brake disk a multiple of the force developed in the booster cylinder.

5. In a booster brake, the combination of a revolvable wheel including a friction disk, a hydraulic booster brake unit having jaws at opposite sides of said disk loosely bolted together and operatively engageable therewith, a lever swingable about a fixed pivot and having a free offset end portion by which said booster brake unit is carried, and guide means for said free lever end portion in a plane parallel to that of the friction disk.

6. In a booster brake, the combination of a revolvable wheel including a friction disk, a hydraulic booster brake unit having jaws at opposite sides of said disk loosely bolted together and operatively engageable therewith, a lever swingable about a fixed pivot and having a free offset end portion by which said booster brake unit is carried, guide lugs attached to said lever, and a stationary guide piece provided with a groove in which said lugs move in a plane parallel to that of the brake disk.

7. A self-energized fluid brake of large energy absorption characteristics and requiring large volume fluid displacement at relatively high pressures including, a stationary axle, a wheel mounted for rotation on the axle, braking surface on the wheel, an arm pivotally mounted adjacent the axle, a booster brake unit carried by the free end of the arm, said brake unit being adapted to engage with the braking surface, hydraulic pressure displacement units fixed to opposite sides of the axle, cam means carried by the free end of the arm and adapted to operate one displacement unit upon operation of the brake unit, with the wheel traveling in one direction, and to operate the other displacement unit when the wheel is traveling in the other direction, and main fluid pressure brake elements operable on the wheel when energized by the operation of one or the other of the displacement units.

8. In a booster brake the combination of a revolvable wheel including a friction disk, a hydraulic booster brake unit movable to a limited extent about the center of said wheel, a stationary hydraulic main brake unit, both brake units operatively engageable with said friction disk, hydraulic booster units in fixed relation to said main brake unit and having roller-provided piston rods and a cam-equipped lever attached to and swingable together with said booster brake unit, one of said cams engaging the roller of one of said piston rods and having such contour that the pressure caused by said cam upon said roller always acts substantially in the center line of said booster unit but is exerting a sufficiently large component force transverse to the piston rod in a direction opposite to that in which the cam moves, thereby transmitting the pressure thus developed in one of the booster units to the main brake unit, depending on the direction of the wheel rotation and compensating the roller friction when the booster brake unit is actuated.

9. In a booster brake, the combination of a wheel including a friction disk, a hydraulic booster brake swingable to a limited extent, a hydraulic booster unit mechanically and operatively connected with said booster brake unit, a main brake unit in hydraulic communication with said booster unit, a brake fluid line connecting the master cylinder actuated by the operator with said booster brake unit, a check valve in said master brake unit opening outwardly and a connection between said check valve and said brake fluid line, said check valve shutting off the communication between said main brake unit and said brake fluid line while the brake is operated, and admitting fluid to said main brake unit when the brake is not in operation.

10. In a booster brake, the combination of a wheel including a friction disk, a hydraulic booster brake cylinder, movable to a limited extent, cooperative with said disk and actuated from the master cylinder through the operator by means of a fluid pressure line, a hydraulic booster cylinder in fixed position operated by mechanical means from said booster brake unit and a main brake unit, including pressure cylinders, in fixed position and hydraulically connected with said booster cylinder, and a check valve in said main pressure unit opening outwardly into the fluid pressure line and controlling the flow therebetween, the cylinder diameters of the master cylinder, the booster brake cylinder, and the booster cylinder being so dimensioned that the unit pressure in the fluid pressure line and, accordingly, in the booster brake cylinder, is greater than that in the booster and main brake cylinders when the brake is in operation.

11. In a brake, the combination of a revolvable wheel including a friction disk, a hydraulic booster brake unit cooperative with and movable to a limited extent together with said friction disk, a separate hydraulic booster cylinder, mechanical means operatively connecting the brake unit with the booster cylinder, said mechanical means being positioned substantially tangential to the movement of the brake unit and in alignment with said booster cylinder, and a main brake unit hydraulically connected with said booster cylinder and acting upon said friction disk.

12. In a brake, the combination of a revolvable wheel including a brake disk, a hydraulic booster brake actuated by the operator and being arcuately movable to a limited extent together with the brake disk and coactive therewith, a separate stationary hydraulic booster cylinder of relatively long stroke but relatively small diameter adapted to be operated by the braking force of said brake booster unit and having its axis substantially in alignment with a tangent on the arc of the circle on which the force acts, and a main brake, including pressure cylinders spaced from and communicating with each other and connected with said booster cylinder, each one of said main brake cylinders being of larger diameter than said booster cylinder and exerting upon the brake disk a multiple of the force developed in the booster cylinder.

13. In a booster brake, the combination of a revolvable wheel including a flat radially-positioned friction disk, a hydraulic booster brake unit adapted to grip and move thru a limited arc with said disk when actuated by the operator, a lever swingable about a fixed pivot positioned offset from the axis of the wheel, said lever having said brake unit attached to its free end at a distance from the axis of the wheel on the side substantially opposite that of the pivot, and a separate stationary booster cylinder operatively connected with said lever between its free end and the axis of the wheel in such a way that forces transmitted from the lever to the booster cylinder are directed substantially in alignment with the axis of the booster cylinder.

14. In combination in a hydraulic brake assembly, a booster brake, conduit means for supplying fluid under pressure to the booster brake, a main brake unit having a plurality of fluid operated cylinders, means energized by the booster brake for supplying fluid under pressure to the main brake unit, and fluid by-pass means connecting the conduit means with the main brake unit, said by-pass means normally being open but closing when the pressure in the conduit means exceeds the pressure in the main brake unit.

15. In combination in a hydraulic brake, a booster brake, conduit means for supplying fluid under pressure to the booster brake, a main brake unit, means energized by the booster brake for supplying fluid under pressure to the main brake unit, and fluid by-pass means connecting the conduit means with the main brake unit.

CARL E. BRICKER.

REFERENCES CITED

The following references are of record in the file of this patent:

UNITED STATES PATENTS

| Number | Name | Date |
|---|---|---|
| 2,351,041 | Hawley | June 13, 1944 |
| 1,704,762 | Reynolds | Mar. 12, 1929 |

FOREIGN PATENTS

| Number | Country | Date |
|---|---|---|
| 439,894 | British | Nov. 29, 1935 |